Patented Oct. 10, 1939

2,175,486

UNITED STATES PATENT OFFICE 2,175,486

PROCESS OF MANUFACTURE OF STARCH MODIFICATION PRODUCTS

Philip A. Singer, Peoria, Ill.

No Drawing. Application August 28, 1937,
Serial No. 161,412

4 Claims. (Cl. 195—24)

This invention relates to new and useful improvement in the process of manufacture of starch modification products. The phrase "starch modification products" is used herein to indicate both modification and conversion products of starch such as laundry starches, starch sugars, breakfast foods, soluble starches, dextrins, gums, syrups, pastes, and mixtures of these products from commercal starches produced from fruits, cereals, and tubers or from the raw materials themselves. The word "modification" as used herein designates either a modification or a conversion and the word "diastase" is used throughout this application in its generic sense meaning all starch hydrolysing or modifying enzymes and is not limited to the enzymes found in barley malt.

In the ordinary processes of manufacturing from either wet or dry starch, starch modification products such as dextrin for example varying amounts of organic or inorganic acids are usually employed. In the established wet processes this is invariably true. Such use of acid is objectionable because the resultant reaction is not uniform and it is very hard to control. Furthermore, the resultant product is apt to injure or stain delicate paper or cloth fabrics. If the acid is neutralized with an alkali the resultant salts cause stains and interfere with the proper setting or drying of the finished product. Also the presence of salts weakens the adhesive property of the paste, gum, or dextrin obtained.

If the dry process is used it is not possible to accurately control the degree of modification and besides the starch must be dried as a prerequisite.

The process which is the subject of my invention utilizes wet starch and eliminates entirely the use of acids. Starch modifying enzymes or diastase are used to effect the modification as will be hereinafter shown.

The primary object of my invention is to provide a simple and inexpensive method of manufacture of such products from a wet starch mixture by the use of starch modifying enzymes as to effect and control the degree of modification by varying the specific gravity or density of the starch and water mixture, the concentration or quantity of the enzymes used and varying the temperatures of the mixture during the modification period.

Products produced by my process can be made in varying degrees of concentration. Ordinarily they are immediately ready for practically every use.

In my invention the degree of modification is carried out by very accurately controlled temperatures in a liquid medium with exacting enzyme concentration. The reaction proceeds at a uniform rate and is accurately controlled.

I have discovered that the completeness of my enzyme modification or conversion is dependent on the degree of concentration of the starch and water mixture to be modified. As an illustration in order to obtain complete modifications thin mixtures of starch and water are employed. I use a varying degree of concentration of starch and water to obtain a varying degree of modification or conversion. I also use a varying amount of enzyme to produce varying degrees of modification or conversion.

I have found that when more concentrated starch and water mixtures are worked with, the modification proceeds more uniformly, and in the end product whether this be a modified starch, soluble starch, or dextrin, the presence of other modification products of starch is negligible. For instance, in the manufacture of dextrin by my process there is only a very insignificant quantity of sugar formed and no starch is present; and in the manufacture of a modified starch product, there is very little or no dextrin or sugar present. My process is so easily and carefully controlled that practically pure products of the kind desired can be produced.

I will now give as an illustration the operation of my improved process in which the end product is dextrin. I prefer to employ a closed type of vessel into which has been introduced a starch and water mixture containing from 25% to 50% of dry starch solids. This mixture is heated to between 140° and 160° F. and a minimum quantity of a cold water infusion of cereal malt such as barley, corn, or wheat or the like, a concentrated solution of the same, or a concentrated solution or syrup of high diastatic activity is added. Normally when a starch and water mixture of the concentration employed in following out my process is heated the mass becomes very thick, unwieldy and unworkable. To prevent this I add a cold water infusion of malt or a concentrated solution of the same or a syrup as specified above to provide a concentration of enzymes necessary to make the mixture mobile and workable after heating. The concentration of the enzymes varies with the concentration of the starch and water mixture. It is recognized that the enzymes must be added just before the thickening temperature is reached. This temperature varies between 140° and 160° F. for different starches. There is variation in these temperatures for the individual starches extracted from fruits, cereals, and tubers depending on the degree of maturity, the type of soil in which they have been grown and the climatic conditions prevailing during growth. As an illustration I prefer, in general, to add the starch modifying enzymes to a mixture of cornstarch and water at a temperature of 149° F. and to tapioca and potato starch and water mixtures at 140° F. I do not limit myself to these temperatures since I have obtained satisfactory results by adding the enzymes at lower temperatures and in some cases I actually prefer to add the enzyme solution at lower temperatures. I do not confine myself to the use of enzymes from cereal malt but may use my diastase from any source. In practice, however, I preferably use barley malt as the diastatic medium. The temperature is increased gradually over a period of about 10 minutes to 176° F. or until the thickened starch medium has thinned to a very thin and mobile liquid. This reaction should not be continued beyond the time necessary to thin the thickened starch.

The temperature is then rapidly raised to about 212° F. or boiling temperature of the mixture when all the openings to or from the vessel are closed and the temperature of the liquid is further raised to a point necessary to effect a complete and thorough gelatinization of the starch.

I prefer to use a cooking or gelatinizing temperature of 280° F. although I do not limit myself to this temperature, recognizing the fact that gelatinization may be carried out above and below this temperature.

After reaching or attaining this temperature of 280° F. holding at this temperature for 5 minutes is sufficient. I do not limit myself to this period of time, realizing that either a longer or a shorter period may be employed.

Although I have cited, in this instance, detailed pressure and elevated temperature and the maintaining of this elevated temperature for a specified time, I wish to specifically indicate that the elevated temperature and the time held at this elevated temperature are not necessary or desirable for the production of some modified starch products—specifically those less highly converted or modified, in which case I prefer to gelatinize the starch by atmospheric boiling which needs in some cases to be for only a very short time.

Having cooked the starch and water mixture for a desired length of time and at the desired temperature, the mass is cooled by suitable means to a temperature of 176° F. (or as in Example I, which will be set forth later, to 158° F.). This temperature is specified to illustrate a particular or specific reaction, and I do not confine myself to this temperature and may use either higher or lower temperatures depending on the degree of modification desired in the finished product.

I now add a cold water infusion of malt or a concentrated solution of the same or a syrup as specified above, to provide the concentration of enzymes necessary to carry the modification or reaction to the desired degree in about 30 minutes at this temperature (176° F.). I do not limit myself to this time, and may hold either for a longer or shorter period depending on the degree of modification desired in the finished product.

Having reached the desired degree or point of modification which can be determined by any one of several established methods, the enzyme action is arrested or stopped by rapidly heating to boiling.

Though I recognize the fact that the step of modification may be arrested or stopped at any desired point through the addition of chemicals, I prefer not to do so.

The modification has now been carried to the desired point, and if the density of the product is not just that wanted for some particular use or application, the solution may be either diluted or concentrated by any established or known method.

Although the process above described is applicable to the manufacture of a pure dextrin, I employ this same process with varying concentrations of starch and water, varying concentrations of starch modifying enzymes, and varying starch gelatinizing and cooking temperatures, pressures, and time to produce different types of modified starch products.

It is basically understood, however, that a minimum amount of enzyme is added to condition the starch before boiling in each and every instance. By so carrying out this process, I can prepare certain types of conversion products heretofore thought impossible.

I use this method to prepare a dextrin from cereal starches equal to or even superior to any heretofore prepared from tapioca or potato starches.

I use this same method to prepare an unrefined body syrup practically free of sugar for brewing and other purposes. I use the same process with variation of starch and water mixture concentration, conditions of gelatinization, temperatures, pressures, time, enzyme concentration, etc. as previously indicated, for the manufacture of such products as: library paste, dextrin gums, paper sizes, laundry starches, textile starches, breakfast foods, vegetable glue, dry paste products, wet paste products, body syrups, starch for candy manufacture, syrup for candy manufacture, syrup for brewing, syrup for beverages and syrup for canning of fruits and vegetables; in fact all modification products of starch.

I now present three different methods of the application of my process for the manufacture of three different types of modified starch products.

Example I 50 pounds of potato starch are mixed with 50 pounds of water in a closed type of vessel and heated to 140° F. as rapidly as possible. I now add a cold water infusion of malt or a concentrated solution of the same or a syrup as specified above to provide the concentration of enzymes necessary to render the mixture mobile and workable after the thickening temperature has been reached.

In the art varying analytical results are obtained by different analysts in determining the diastatic strength of cold water infusions of malt or concentrated solutions of the same or of syrups as specified above. I prefer to designate the strength of the solution as being 100 degrees Lintner when the complete reduction of 5 milliliters of standard mixed Fehling solution is obtained by one tenth milliliter of a 5% solution of the material being tested.

This concentration of enzymes is obtained by adding 3 pounds of cold water infusion of malt having a diastatic strength of 75 degrees Lintner or an equivalent quantity of a concentrated solution of the same or a syrup as specified above.

The temperature is now raised to 158° F. as rapidly as possible and then raised about 2° F.

per minute for 10 minutes to 176° F. then raised as rapidly as possible to boiling and boiled at atmospheric pressure for 10 minutes. The cooked mass is then cooled to 158° F. and I now add 9 pounds of a cold water infusion of malt having a diastatic strength of 75 degrees Lintner or an equivalent quantity of a concentrated solution of the same or of a syrup as specified above. The mixture is held at 158° F. for twenty-five minutes and the temperature raised rapidly to a boil.

The product thus obtained is a mixture of modified starch and dextrin, is a slow setting paste product, and in concentrated form can be used as a library paste, vegetable glue, paper size, textile size, and a paper box paste.

Example II 50 pounds of corn starch are mixed with 100 pounds of water in a closed type of vessel and heated to 149° F. as rapidly as possible. I now add a cold water infusion of malt or a concentrated solution of the same or a syrup as specified above to provide the concentration of enzymes necessary to make the mixture mobile and workable after the thickening temperature has been reached. This concentration of enzymes is obtained by adding 3 pounds of a cold water infusion of malt having a diastatic strength of 75 degrees Lintner, as defined in Example I, or an equivalent quantity of a concentrated solution of the same or of a syrup as specified above. The temperature is now raised to 158° F. as rapidly as possible, then raised about 2° F. per minute for 10 minutes to 176° F., then raised as rapidly as possible to boiling when all openings to or from the vessel are closed and the temperature of the liquid is then further raised to 280° F. This temperature is maintained for 5 minutes then cooled to 176° F. I now add 12 pounds of a cold water infusion of malt having a diastatic strength of 75 degrees Lintner or an equivalent quantity of a concentrated solution of the same or of a syrup as specified above. This mixture is held at 176° for thirty minutes and the temperature then raised rapidly to boiling.

The product so obtained is almost a pure dextrin, there being no starch present, and only a very small quantity of sugar. In concentrated form this product can be used as a dextrin gum, envelope gum, dextrin size, and in fact for any purpose for which a dry dextrin is used.

Example III

⅓ pounds of corn starch are mixed with 100 pounds of water in a closed type of vessel and heated to 149° F. as rapidly as possible. I now add a cold water infusion of malt or a concentrated solution of the same or a syrup as specified above to provide the concentration of enzymes necessary to make the mixture mobile and workable after the thickening temperature has been reached. This concentration of enzymes is obtained by adding 1½ pounds of cold water infusion of malt having a diastatic strength of 75 degrees Lintner, as defined in Example I or an equivalent quantity of a concentrated solution of the same or of a syrup as specified above.

The temperature is now raised to 158° F. as rapidly as possible, then raised about 2° F. per minute for 10 minutes to 176° F., then raised as rapidly as possible to boiling when all openings to or from the vessel are closed and the temperature of the liquid is further raised to 280° F. This temperature is maintained for 5 minutes then cooled to 176° F.

I now add 6 pounds of a cold water infusion of malt having a diastatic strength of 75 degrees Lintner or an equivalent quantity of a concentrated solution of the same or a syrup as specified above. This mixture is held at 176° F. for twenty-five minutes and the temperature then raised rapidly to boiling.

The product thus obtained is predominating in dextrin, and varies from that produced under Example II in that the sugar content is slightly higher. It finds use as is, or in concentrated form as a body syrup for brewing, a syrup for candy manufacture, beverage manufacture, and for the canning of fruits and vegetables. It is also used in such cases where a slow setting dextrin product is desired.

In each of the above three applications of my process a finished product has been produced. These products may be used as they are, may be diluted or concentrated to satisfy specific needs, or may be refined and then concentrated for other purposes.

I claim:

1. A process for the manufacture of a substantially pure dextrinous product comprising heating to between about 140° to 160° F. a mixture of starch and water containing from about 25% to 50% dry starch solids by weight, then adding the minimum quantity of diastase necessary to make the solution mobile after further heating, gradually increasing the temperature over a period of about ten minutes to about 176° F. when the mixture becomes very thin, rapidly raising the temperature to the boiling point of the mixture, heating to thoroughly gelatinize the starch, cooling to about 176° F., adding from about 6 to 12 pounds cold water infusion of malt having a diastatic strength of 75° Lintner, holding at said temperature for from about twenty five to thirty minutes and then rapidly raising the temperature to the boiling point to arrest further reaction.

2. A process of manufacturing a starch modification paste product consisting of a mixture of modified starch and dextrin comprising, heating a mixture of about 50 pounds of potato starch and about 50 pounds of water to about 140° F. as rapidly as possible, adding about three pounds of a cold water infusion of malt having a diastatic strength of about 75° Lintner, raising the temperature rapidly to about 158° F., raising the temperature at the rate of about 2° F. per minute for about 10 minutes to about 176° F. raising the temperature rapidly to boiling point, boiling at atmospheric pressure for about 10 minutes, cooling to about 158° F., adding about 9 pounds of a cold water infusion of malt having a diastatic strength of about 75 degrees Lintner, holding at 158° F. for about twenty-five minutes and then rapidly raising the temperature to the boiling point.

3. A process of manufacturing a substantially pure dextrin comprising heating a mixture of about 50 pounds of corn starch and about 100 pounds of water to about 149° F. as rapidly as possible, adding about 3 pounds of a cold water infusion of malt having a diastatic strength of about 75 degrees Lintner, raising the temperature to about 158° F. as rapidly as possible, raising the temperature at the rate of about 2° per minute for about 10 minutes to about 176° F., raising the temperature as rapidly as possible to boiling, heating under pressure to about 280° F., holding at said temperature for about 5 minutes, cooling to about 176° F., adding about 12 pounds of a cold water infusion of malt having a diastatic strength of about 75 degrees Lintner, holding at 176° F. for about 30 minutes and then rapidly raising the temperature to boiling.

4. A process of manufacturing a dextrin syrup comprising heating a mixture of about 33⅓ pounds of corn starch and about 100 pounds of water to about 149° F. as rapidly as possible, adding about 1½ pounds cold water infusion of malt having a diastatic strength of about 75 degrees Lintner, raising the temperature as rapidly as possible to about 158° F., raising the temperature at the rate of about 2° F. per minute for about 10 minutes to about 176° F., raising the temperature as rapidly as possible to boiling, heating under pressure to about 280° F., holding at said temperature for about 5 minutes, cooling to about 176° F., adding about 6 pounds of cold water infusion of malt having a diastatic strength of about 75 degrees Lintner, holding at 176° F. for about 25 minutes and then rapidly raising the temperature to boiling.

PHILIP A. SINGER.